April 2, 1935.  L. E. LA BRIE  1,996,248

BRAKE

Original Filed Sept. 6, 1928

INVENTOR.
LUDGER E. LA BRIE
BY
ATTORNEY

Patented Apr. 2, 1935

1,996,248

UNITED STATES PATENT OFFICE 1,996,248

BRAKE

Ludger E. La Brie, South Bend, Ind., assignor to Bendix Brake Company, South Bend, Ind., a corporation of Illinois Original application September 6, 1928, Serial No. 304,196. Divided and this application August 30, 1933, Serial No. 687,431

9 Claims. (Cl. 188—78)

This invention relates to brakes, and is illustrated as embodied in an internal expanding automobile brake of the shiftable anchorage type. An object of the invention is to provide simple and inexpensive means for adjustably positioning the friction means of a brake, whether or not the brake is of the illustrative type.

Preferably the adjusting device is mounted on the backing plate of the brake, for example by clamping the plate between a nut or other means on one side of the plate and a collar or the like on the other side of the plate, and has its end formed for engagement with a wrench or other tool for making the adjustments from outside the brake.

The other end of the device is shown formed as a steady rest for the shoe, for example passing through an opening in the shoe web and having a part such as an end washer engaging the opposite face of the web.

According to an important feature of the invention, the device is provided between its ends with adjustable shoe-positioning means such as an eccentrically mounted roller arranged to engage the inner face of the rim of the shoe. In the illustrated arrangement the side of the roller engages the above-described collar.

Figure 1:
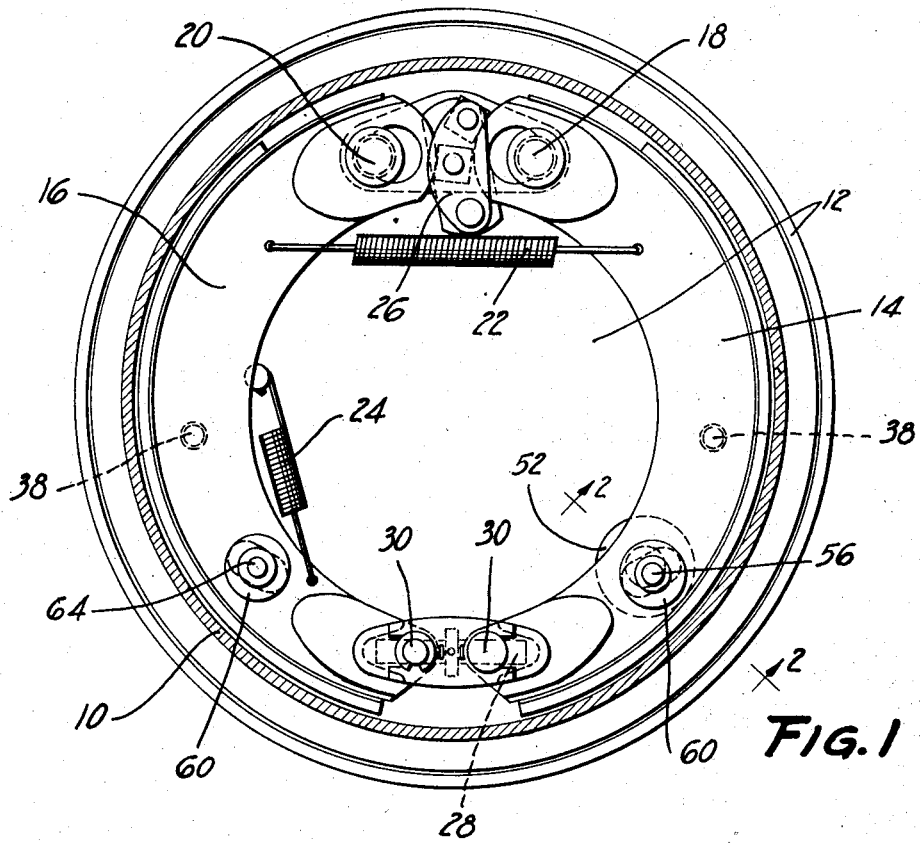
Figure 2:
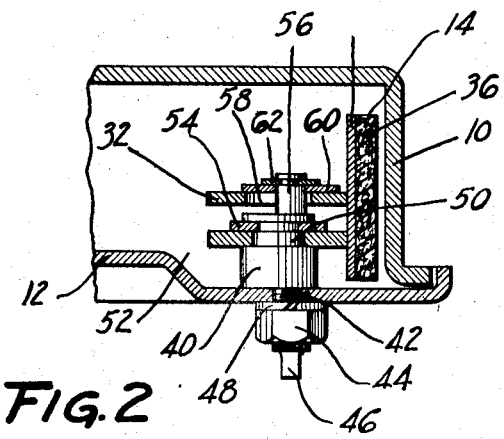

The above and other objects and features of the invention, including various novel combinations of parts and desirable particular constructions, will be apparent from the following description of the illustrative embodiment shown in the accompanying drawing, in which:

Figure 1 is a vertical section through the brake, just inside the head of the brake drum, and showing the brake shoes in side elevation; and Figure 2 is a partial radial section on the line 2—2 of Figure 1, showing the adjusting device which forms the subject of the present invention.

The illustrated brake is fully described, and is claimed, in my parent application 304,196, filed September 6, 1928, of which the present application is a division, as to all subject-matter herein claimed. As explained in said parent application, the brake may include a rotatable drum 10, at the open side of which is a support such as a backing plate 12, and within which are arranged brake shoes 14 and 16 or equivalent friction means.

In the particular brake illustrated, the shoes anchor on anchor posts 18 and 20 extending through openings in the shoe webs and which are mounted on the backing plate, and are applied (against the resistance of main and auxiliary return springs 22 and 24) by means such as a floating cam lever 26 or the like.

The lower ends of the shoes are adjustably connected by floating means such as a right-and-left threaded connecting member 28 having its ends adjustably threaded into pivots 30 mounted in the shoe ends. As best appears in Figure 2, each shoe preferably comprises a web 32 welded or otherwise secured to a rim 34 faced with brake lining 36. The sides of the webs 32 next the backing plate may engage the rounded ends of steady rest pins 38 carried by the backing plate.

The present divisional application has to do with the shoe-positioning device shown in detail in Figure 2. In the illustrated embodiment, this device includes a collar 40 engaging the inner face of the backing plate, and a threaded stem 42 passing through the backing plate and provided with a nut 44 or other means for clamping the backing plate against the collar 40.

The end of the stem 42 is formed at 46 for engagement with a wrench or other tool for turning the device to make the adjustment described below. The nut 44 may, if desired, be provided with a lock washer or the like 48.

On an eccentric shoulder 50, just inside the collar 40 and shown as coaxial with respect to the collar, there is arranged a roller 52 held between the collar 40 and a U-shaped spring washer 54 seated in a suitable groove. The roller 52 adjustably engages the inner face of the rim 34, being moved in and out radially of the brake by turning the part 46.

The end of the adjusting device opposite the part 46 is formed as a steady rest for the brake shoe, and is shown provided with a shank 56 passing through an opening 58 in the shoe web, and as having at its end a steady rest part such as a washer 60 held by a U-shaped spring washer 62 seated in a groove in the end of the shank 56. The washer 60 engages the shoe web on the side facing toward the head of the brake drum.

The shoe 16 may have a steady rest 64 which may if desired be like the adjusting device described above except that roller 52 is omitted.

In the illustrated brake, the shoe 16 anchors on post 20 when the drum is turning clockwise, and the shoe 14 anchors on post 22 when the drum is turning counterclockwise. This involves substantial lengthwise movement of the shoes, which is facilitated by the movement of roller 52 on the shoe rim 34 and during which the shoe web 32 slides between the steady rest washer 60 (and the corresponding washer of device 64) and the steady rest pins 38.

While one illustrative embodiment has been described in detail, it is not my intention to limit the scope of the invention to that particular embodiment, or otherwise than by the terms of the appended claims.

I claim:

1. A brake comprising a backing plate having movably associated therewith a shoe formed with a web and a rim, and a device mounted on the backing plate and having a steady rest portion engaging said web and having a positioning roller eccentrically adjustably mounted thereon and engaging said rim.

2. A brake comprising a backing plate having movably associated therewith a shoe formed with a web and a rim, said web having an opening therethrough, and a device mounted on the backing plate projecting through said opening and having a steady rest part engaging the side of said web and having a positioning roller eccentrically adjustably mounted thereon and engaging said rim.

3. A brake comprising a backing plate having movably associated therewith a shoe formed with a web and a rim, and a device mounted on the backing plate and having a steady rest portion engaging said web and having a positioning part arranged between the web and backing plate and engaging the inner face of said rim.

4. A brake comprising a backing plate having movably associated therewith a shoe formed with a web and a rim, said web having an opening therethrough, and a device mounted on the backing plate projecting through said opening and having a steady rest part engaging the side of said web and having a positioning part arranged between the web and backing plate and engaging the inner face of said rim.

5. A brake comprising a backing plate having movably associated therewith a shoe formed with a web and a rim, and a device mounted on the backing plate and having a steady rest portion engaging said web and having a positioning part arranged between the web and backing plate and engaging the inner face of said rim, said device being adjustably mounted on the backing plate and arranged to permit adjusting said part in or out radially of the brake.

6. A brake comprising a backing plate having movably associated therewith a shoe formed with a web and a rim, said web having an opening therethrough, and a device mounted on the backing plate projecting through said opening and having a steady rest part engaging the side of said web and having a positioning part arranged between the web and backing plate and engaging the inner face of said rim, said device being adjustably mounted on the backing plate and arranged to permit adjusting said part in or out radially of the brake.

7. An adjusting device for a brake or the like comprising a threaded stem adapted to be mounted in a backing plate and having its end outside said plate formed for engagement with a tool to turn said device, a steady rest part at the opposite end of said device, and an eccentrically mounted roller between said ends adapted to engage the inner face of the rim of a brake shoe.

8. An adjusting device for a brake or the like comprising a portion adapted to be adjustably mounted in a backing plate and having its end outside said plate formed for engagement with a tool to adjust said device, a steady rest part at the opposite end of said device, and an eccentrically mounted roller between said ends adapted to engage the inner face of the rim of a brake shoe.

9. An adjusting device for a brake or the like comprising a portion adapted to be adjustably mounted in a backing plate and having its end outside said plate formed for engagement with a tool to adjust said device, a steady rest part at the opposite end of said device, and means between said ends for adjustably engaging and positioning the inner face of the rim of a brake shoe.

LUDGER E. LA BRIE.